United States Patent
Lowe

(10) Patent No.: US 10,336,286 B2
(45) Date of Patent: Jul. 2, 2019

(54) FILTRATION DEVICES FOR USE IN AUTOMOTIVE AIRBAG APPLICATIONS AND RELATED METHODS

(71) Applicant: Trafalgar Associates, LLC, Vonore, TN (US)

(72) Inventor: Vernon J. Lowe, Greenback, TN (US)

(73) Assignee: Trafalgar Associates, LLC, Vonore, TN (US)

( * ) Notice: Subject to any disclaimer, the term of this patent is extended or adjusted under 35 U.S.C. 154(b) by 0 days.

(21) Appl. No.: 14/991,144

(22) Filed: Jan. 8, 2016

(65) Prior Publication Data

US 2016/0200282 A1 Jul. 14, 2016

Related U.S. Application Data

(60) Provisional application No. 62/101,270, filed on Jan. 8, 2015.

(51) Int. Cl.
*B60R 21/26* (2011.01)
*B01D 39/20* (2006.01)

(52) U.S. Cl.
CPC .......... *B60R 21/26* (2013.01); *B01D 39/2051* (2013.01); *B01D 39/2093* (2013.01); *B01D 2239/1208* (2013.01); *B60R 2021/26011* (2013.01)

(58) Field of Classification Search
CPC ............ B01D 46/0065; B01D 46/2407; B01D 2273/30
See application file for complete search history.

(56) References Cited

U.S. PATENT DOCUMENTS

| 4,419,113 A | * | 12/1983 | Smith | B01D 46/0021 422/562 |
| 4,687,579 A | * | 8/1987 | Bergman | B01D 25/26 210/347 |
| 5,238,472 A | * | 8/1993 | Pfister | F01N 3/0212 55/282 |
| 5,372,380 A | * | 12/1994 | Duffy | B01D 39/2055 280/740 |
| 5,456,492 A | * | 10/1995 | Smith | B60R 21/26 137/68.13 |

(Continued)

OTHER PUBLICATIONS

International Search Report and Written Opinion for International Application No. PCT/US2016/012623 dated Mar. 11, 2016.

(Continued)

*Primary Examiner* — Amber R Orlando
(74) *Attorney, Agent, or Firm* — J. Bennett Mullinax, LLC

(57) ABSTRACT

The present disclosure provides filtration devices for use in automotive airbag applications and related methods. For example, a filtration device for use in automotive airbags can be provided that includes a body comprising at least one of a reticulated metal foam or a reticulated ceramic foam. In some embodiments, the body can have between about 35 pores per square inch and about 65 pores per square inch through which air passes that is generated upon activating a pyrotechnic charge in an air bag inflation mechanism. In some embodiments, the body can include interconnected struts that define pores within the body through which gas passes that is generated upon activating a pyrotechnic charge in an air bag inflation mechanism.

19 Claims, 10 Drawing Sheets

(56) References Cited

U.S. PATENT DOCUMENTS

| | | | | |
|---|---|---|---|---|
| 5,480,185 | A * | 1/1996 | Lowe | B60R 21/26 280/740 |
| 5,483,896 | A | 1/1996 | Hock et al. | |
| 5,547,638 | A * | 8/1996 | Rink | B01D 39/2051 280/736 |
| 5,564,741 | A * | 10/1996 | Ward | B60R 21/2644 280/740 |
| 5,582,427 | A * | 12/1996 | Rink | B60R 21/2644 102/531 |
| 5,709,722 | A * | 1/1998 | Nagai | B01D 46/0063 55/499 |
| 5,746,793 | A * | 5/1998 | Rink | B01D 39/2031 280/740 |
| 5,759,219 | A | 6/1998 | Rink et al. | |
| 6,013,118 | A * | 1/2000 | Matsunuma | B01D 46/002 55/282.3 |
| 6,273,925 | B1 * | 8/2001 | Alvin | B01D 39/2027 55/282.2 |
| 6,773,825 | B2 * | 8/2004 | Pickrell | C04B 38/0655 428/306.6 |
| 7,506,504 | B2 * | 3/2009 | Kumar | F01N 3/0222 422/170 |
| 7,521,033 | B2 * | 4/2009 | Galligan | B01D 39/2051 422/168 |
| 7,527,774 | B2 * | 5/2009 | Galligan | F01N 1/081 181/212 |
| 8,202,346 | B1 * | 6/2012 | Aubrey | B22C 9/086 210/496 |
| 2006/0266714 | A1 * | 11/2006 | Olson, III | B01D 39/2093 210/767 |
| 2009/0032034 | A1 * | 2/2009 | Steinberg | A24F 1/00 131/194 |
| 2009/0079104 | A1 | 3/2009 | Greenwood | |
| 2009/0084078 | A1 * | 4/2009 | Furuyama | F21S 48/335 55/385.4 |
| 2010/0147760 | A1 * | 6/2010 | Leavitt | C02F 9/005 210/317 |
| 2012/0102902 | A1 * | 5/2012 | Gallagher | B01D 46/0021 55/484 |

OTHER PUBLICATIONS

"Reticulated Foam" entry as of Dec. 2, 2014, the Wikipedia, the free encyclopodia, website http://en.wikipdedia.org/wiki/Reticulated_foam.

* cited by examiner

FILTRATION DEVICES FOR USE IN AUTOMOTIVE AIRBAG APPLICATIONS AND RELATED METHODS

RELATED APPLICATION

The presently disclosed subject matter claims the benefit of U.S. Provisional Patent Application Ser. No. 62/101,270, filed Jan. 8, 2015, the disclosure of which is incorporated herein by reference in its entirety.

TECHNICAL FIELD

The present subject matter relates to filtration devices and related methods. In particular, the present subject matter relates to filtration devices for use in automotive airbags that can withstand extended exposure to high temperatures and diffuse heat generated by the activation of the airbags and methods of making and using such filtration devices.

BACKGROUND

An airbag is a vehicle safety device that generally includes a flexible envelope (e.g., a nylon fabric) designed to inflate rapidly during an automobile collision. The airbag's purpose is to cushion occupants during a crash and provide protection to their bodies when they strike interior objects such as the steering wheel, window and/or structural components of the vehicle. Modern vehicles may contain multiple airbags in various side, seat, and/or frontal locations of the passenger and driver seating positions, and sensors may deploy one or more airbags in an impact zone at variable rates based on the type and the severity of impact.

Many airbags are inflated by the ignition of a gas generating propellant via a pyrotechnic device, which rapidly inflates a flexible envelope. The pyrotechnic device usually includes an electrical initiator wrapped in a combustible material and can activate quickly (e.g., less than 2 milliseconds) with a current pulse of about 1 to 3 amperes. When the initiator becomes hot enough, it ignites the combustible material (e.g., a solid propellant). The burning propellant generates inert gas which rapidly inflates the airbag (e.g., the typical rate of inflation in current technology is about 10 to 40 milliseconds). For successful activation, the process requires the pyrotechnic device to generate a high velocity gas that rapidly fills the cushion. The inflation gas will be at high temperature, but relatively low pressure.

A typical combustion gas generant process can include Basic Copper Nitrate ($Cu_2(NO_3)(OH)_3$) (hereinafter "BCN") and Guanidine Nitrate $C(NH_2)_3NO_3$ (hereinafter "GN") and various mineral based oxides. The combustion process generates three typical gas byproducts, water ($H_2O$), carbon dioxide ($CO_2$) and nitrogen ($N_2$). Nitrogen, which generally acts like an inert gas, is used to inflate the air cushion. In addition, the process generates a range of minerals, these minerals can vary. For example, the most significant minerals generated by the process can be Copper bearing minerals. However, the minerals can also include Aluminum (Al), Chloride (Cl), Cyanate compounds, Iron (Fe), Nitrite compounds, Phosphorus (P), Potassium (K), and Titanium (Ti) bearing minerals. These substances occur in a range of particle sizes from microscopic to 1.5 millimeters (mm), and can also reach generant gas temperatures of 700-900° C. just after ignition. Clearly, these extremely hot particulates, if permitted to enter the air cushion, can cause a catastrophic failure. To prevent this, the current technology introduces a filter that also operated as a diffuser at a point prior to where the generant gas jet exits into the air cushion of the fabric bag. The filter is positioned at this point to capture the particulates generated by the combustion reaction and also absorb some of the heat generated by the combustion, thereby lowering the exit gas temperature and the ultimate temperature reached by the airbag. This filter is usually located inside the air cushion inflator device and may take different shapes according to the air cushion size, shape and location in the vehicle. The inflator device can be high temperature pyrotechnic, pyrotechnic hybrid or simply compressed gas activated. The filter is typically a mechanism made of metal with convoluted passages to permit the inflation gas to exit the inflator while collecting particulates within the passages. The gas and particulates transfer heat via conduction and convection to the filter as the gas exits to inflate the cushion.

Current airbag filter technology mainly consists of stainless wire of various diameters knitted into a rope configuration and then compressed to form a cylinder or some other shape. Filters can also be of a pressed convoluted metal foil design. Compression of the material creates an interference condition between the wires and forms a relatively solid structure with a fairly open tolerance of +/− about 6% on the weight. Due to the method of manufacture, the actual structure of the wire filter is somewhat non-uniform and results in irregular distortion of the wire and consequential creation of internal voids and a general lack of homogeneous wire distribution. While the filter demonstrates the ability to retain some of the particulates generated by the combustion process, the retention occurs in a somewhat irregular and unpredictable manner. The density of the filter is also a significant factor in absorbing heat. In particular, the inflation gas heat transfer process is heavily dependent upon the level of surface contact on the "gas wetted" surfaces. At relatively high densities, the wire can start to impinge on itself, reducing the gas wetted surface available to conduct and/or absorb heat and collect particulates.

Ultimately, the function of the pyrotechnic activation device is to generate a given volume of gas to fill an air bag cushion mechanism in the minimum elapsed time. Rapid generation of the gas occurs via a chemical combustion process that creates high temperature and high velocity, the latter of which ensures the rapid inflation/activation of the air cushion. The inflation gas will be at high temperature, but relatively low pressure. A filter/heat diffuser is employed to capture products of combustion and limit the amount of heat entering the air bag, thereby preventing catastrophic failure due to puncture of the cushion envelope.

The filter typically used in air bags today has a relatively high density and resultant pressure drop. Because of this, an excessive amount of energy is required to force a sufficient volume of gas at very high velocity through the filter in order to inflate the air bag in a sufficient amount of time. This energy in turn translates to a large amount of heat and can cause certain air bag inflator components to reach very high temperatures (e.g., 700-900° C.). Should any of these heated components come into contact with someone or something, they could potentially induce third degree burns or start a fire. Because of these extreme temperatures, the air bag itself must be designed with multiple layers of expensive, highly refractory polymeric materials to act as a heat shield and prevent burns and fires. The relatively irregular structure of the current filter suggests the pressure drop is highly variable from filter to filter creating performance variations.

Current test technology can only produce a pass or fail using a complete functional airbag test which is time consuming and does not easily quantify the relative performance of various sample materials/components. Research suggests the impinging shock wave has a profound effect on performance of heat shield materials and filter/heat diffuser mechanisms. The filter testing apparatus can also permit detailed evaluation of sewn structural integrity of air cushion seams and the development of economic textile alternatives to current seam protection devices.

Although useful, the gravity "hot rod" testing introducing a given mass at a known temperature only provides a very basic thermal resistivity measure and does not replicate the shock wave and high velocity impact experienced when the material is subject to igniter/generant gas jets. Possibly the most detrimental and destructive force impacting the performance of the air bag heat shield is the effect that an impinging under-expanded jet bow shock wave can have on the coated surface and mechanical structure of the heat shield substrate fabric. Couple this effect with the gas having extreme velocity and temperature in excess of 700° C., and the challenge of designing a next generation, robust, efficient heat shield is apparent.

As such a need exists for a filtration device that can be used within an airbag system that provides a more consistent pressure drop from filter to filter, more consistently removes particulates from the high velocity generated gas, and better removes heat from the high velocity generated gas before entry into the fabric air bag of the air cushion of the airbag system.

SUMMARY

The present subject matter provides filtration devices and related methods. In particular, the present subject matter relates to filtration devices for use in automotive airbags that can withstand extended exposure to high temperatures and diffuse heat generated by the activation of the airbags. Methods related to the manufacture and use of the filtration devices disclosed herein are also provided.

Thus, it is an object of the presently disclosed subject matter to provide filtration devices for use in automotive airbags and methods of manufacturing and using such filtration devices. While one or more objects of the presently disclosed subject matter having been stated hereinabove, and which can be achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1A:
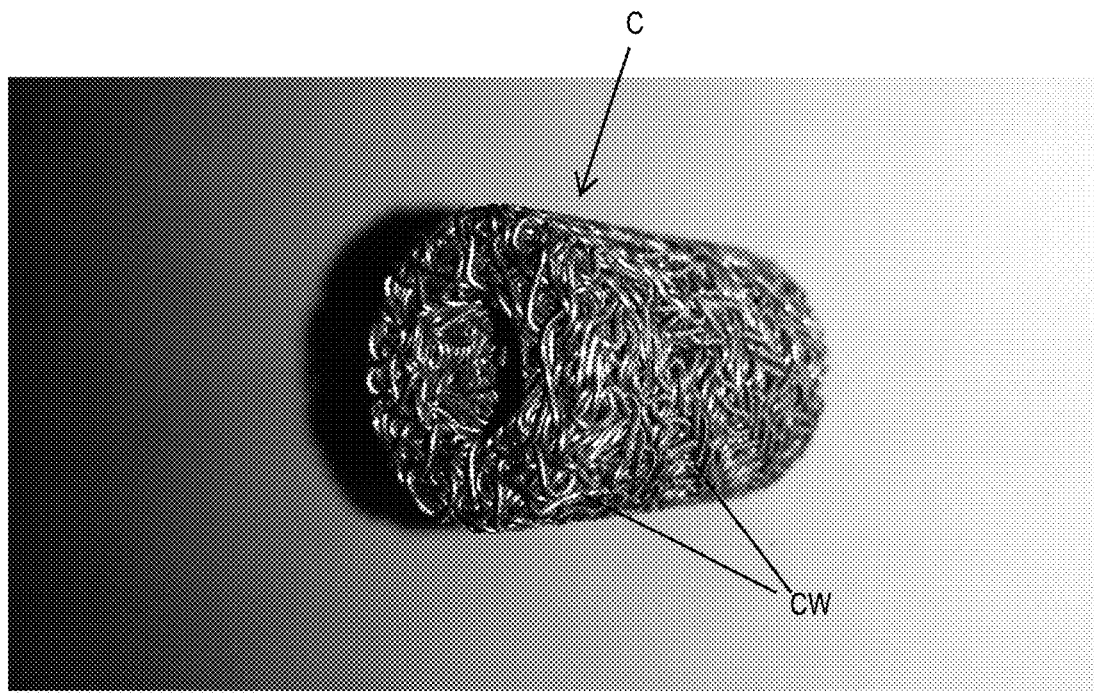
FIG. 1A illustrates a perspective view of a conventional crushed wire filtration device used in airbag inflation mechanisms.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material, including but not limited to metallic polymers and ceramic polymers. These configurations include, but are not limited to isotactic, syndiotactic, and random symmetries.

As used herein, the term "gas wetted surface area" or "gas wetted surface" generally refers to surfaces that are contacted by a gas passing through the filter.

As used herein, the term "density" can refer to the mass per volume of the walls of a filtration device or to a percentage of volume occupied by material, or materials, that comprise the filter, or filtration device. The percentages can be expressed based on a volume of the body of the filtration device as a whole in which material resides or as a volume per unit length of the filtration device to express the expected uniformity of across the entire filter body in which material resides. For example, when looking at a filtration device in the shape of a cored cylinder having a bore therethrough, the percentage of volume is based on the volume of the filtration device occupied by the walls of the cylinder and does not include the volume of the open space of the bore therethrough.

Figure 14:
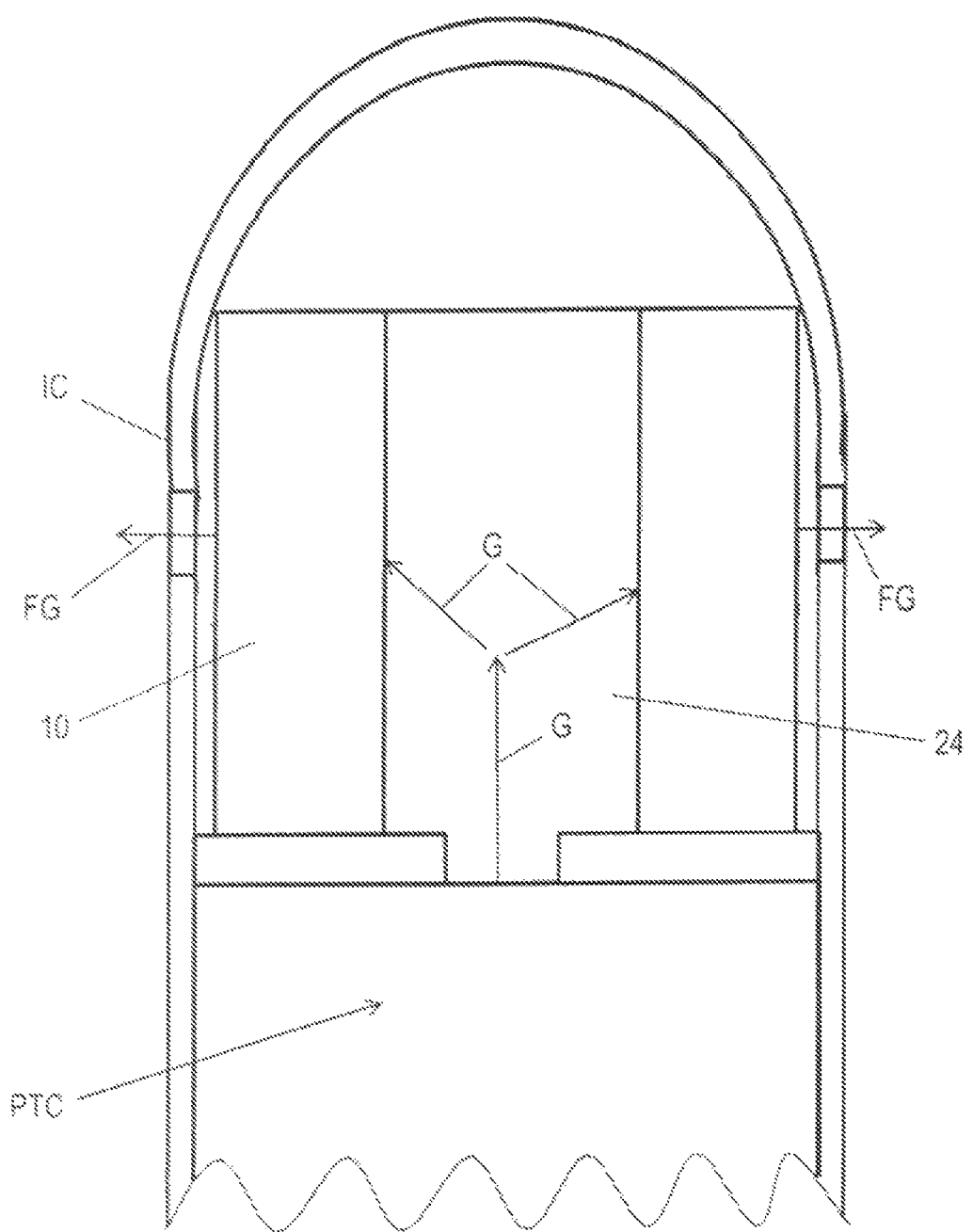
FIG. 14 illustrates a schematic cross-sectional view of an additional embodiment of a filtration device in airbag inflation mechanisms according to the present subject matter.

As shown in FIG. 14, the present disclosure relates to the filtration devices 10 that can be used within automotive airbags to filter high velocity gases G produced by the pyrotechnic charge PTC in an airbag inflation mechanism IC to Provide a filtered gas FG to inflate an automotive airbag. If the pressure drop of the filtration devices can be reduced without sacrificing its particulate capture efficiency and structural integrity with the filtration devices being produced with a consistent structure, the amount of energy required to inflate the air bag in sufficient time can potentially be reduced. A reduction in the amount of energy needed can also result in a reduction in the temperature reached by the generated high velocity gases. Reduction in inflation temperatures has potentially both economic and product performance benefits. The filtration devices disclosed herein should extract and retain the waste particulates and byproducts of the combustion used to generate the high velocity gas in the inflator system while passing the generant gas, such as nitrogen gas, into the air cushion. The filtration devices should also act as a heat exchanger, or a heat sink, and extract heat from the generant gas as it passes through the filtration device and exits the inflator system.

In developing the filtration devices disclosed herein, parameters that were considered include, but are not necessarily limited to, the solid content, or net weight, of the filtration devices; the density range of the filtration devices; the viscosity and/or rheology of the metallic or ceramic polymeric material used in the reticulated foam; the particle size and shape of the particulates to be captured by the filtration device; the wettability of the surfaces within the filtration devices; the types and number of rheological aids such as soaps, wetting compounds, mixing agglomerations, or the like, that are used in processing the foam used to form the filtration devices; the geometries and designs of the struts within the filtration devices; and the ability for the filtration devices to retain an open structure taking into account sintering densification and/or shrinkage during use. When determining the materials used in the reticulated foams, the parameters considered can include, but are not limited to, strength, structural integrity, weight, corrosion resistance, heat absorption properties, and cost of the polymeric material to be used.

The basic structural integrity of the filtration devices disclosed herein can withstand the inflator system environment with at least equivalent performance than the conventional airbag filtration devices currently used. The filtration devices disclosed herein can have struts that provide geometries, irregular surfaces, and/or gas wetted surface that have greater filter retention performance, i.e., are better at removing waste particulates and byproducts (i.e., debris) of the combustion used to generate the high velocity gas in the inflator system, than conventional airbag inflator filtration devices. Similarly, the filtration devices disclosed herein are good at extracting heat from the inflation gas without restricting the inflation event. Through the strut geometry, gas wetted surfaces, and pore sizes of the filtration devices disclosed herein, the amount the debris captured by volume, the range of particulate size of the debris that is captured, and the amount of heat absorption by the filtration devices disclosed herein is better when compared against conventional airbag filtration devices currently used.

Figure 1B:
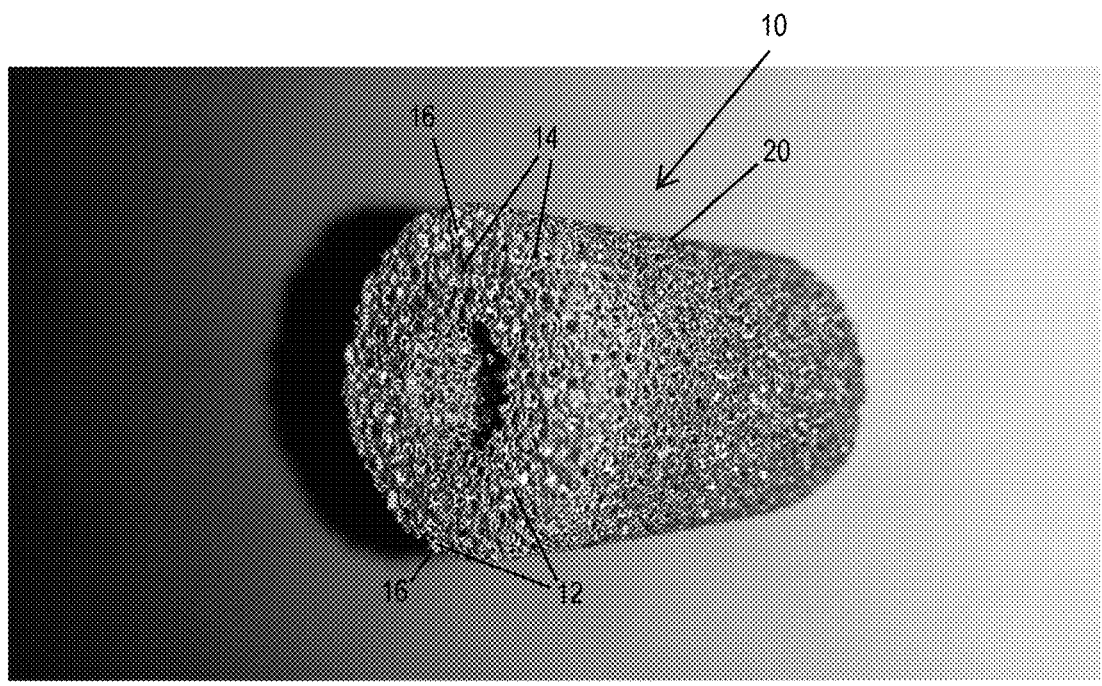
FIG. 1B illustrates a perspective view of an embodiment of a filtration device having a body of reticulated material for use in airbag inflation mechanisms according to the present subject matter.

Referring to FIG. 1B, the use of a reticulated metal or ceramic foam filtration device 10 for use in an airbag inflation mechanism has the ability to address the requirements for lesser pressure drop, a potentially reduced mass, and a more consistent and homogeneous filter structure. The use of a reticulated metal or ceramic foam filtration device 10 can comprise struts 12 that can define pores 14 through which gases generated by the pyrotechnic charge in an airbag inflation mechanism can travel. The interconnect struts 12 also provide a large gas wetted surface 16. As compared to current filtration devices, such as the wire filtration device C that comprises crushed wires CW shown in FIG. 1A beside the reticulated metal or ceramic foam filtration device 10. Thereby, the reticulated metal or ceramic foam filtration device 10 can consequently have improved thermal transfer properties. Thus, a reticulated metal or ceramic foam filtration device 10 can provide intriguing possibilities for changing and improving the overall design of an inflator system. In particular, a reticulated metal or ceramic foam filtration device 10 can potentially reduce the material density of the filtration device 10 to provide relative weight saving and can also reduce pressure drop by having a more consistent internal filter structure. For example, a reticulated metal or ceramic foam filtration device 10 can have a more homogeneous pore size distribution of the pores 14 over a body 20.

A reticulated metal or ceramic foam filtration device 10 can have a relatively larger gas wetted surface area 16 while still having a structural integrity to resist the impinging jet supersonic shock with more uniform struts 12 due to how the filtration device 10 is constructed. The structure of a reticulated metal or ceramic foam filtration device 10 also can provide the ability to rapidly absorb heat from generated high temperature and high velocity gas and remove from the generated gas generally all inflator particulates greater in diameter than about 0.002 of an inch. In some embodiments, the structure of a reticulated metal or ceramic foam filtration device 10 also can provide the ability to rapidly absorb heat from the generated gas and remove from the generated gas generally all inflator particulates greater in diameter than about 0.001 of an inch. It is noted that, generally speaking, particles the size and mass of 0.002 inches based on current propellant technologies even traveling at Mach 1.3 do not puncture conventional fabrics used in airbags.

Reticulated foam is a porous, low density solid foam. Reticulated foams can be extremely open foams, i.e., there are few, if any, intact cell windows. In a reticulated foam only the lineal boundaries where the bubbles meet remain. The solid component of a reticulated foam for the filter for the airbag system can be a ceramic or a metal. These materials can provide a high porosity and large surface area that can be useful in removing particulates and can diffuse heat from the generated high velocity gas. Reticulated ceramic foams and reticulated metal foams can be made in a conventional manner. For example, reticulated ceramic foams can be made by coating a reticulated polyurethane foam with an aqueous suspension of a ceramic powder then heating the material to first evaporate the water then fuse the ceramic particles and finally to burn off the organic polymer. Similarly, a reticulated metal foam can also be made using polyurethane foam as a template similar to its use in ceramic foams. Metals can be vapor deposited onto the polyurethane foam and then the organic polymer can be burned off. The process of forming the filtration device can include use of a reticulated foam core process using a stainless steel polymer material. The process can provide a more homogeneous filtration structure while providing the ability to vary and/or control the 'pore size' and 'gas wetted' surface geometry of filtration devices.

For example, in some embodiments, the reticulated foam body 20 of the filtration device 10 can comprise a large particle polymer metal foam. In some embodiments, the reticulated foam body 20 of the filtration device 10 can comprise large stainless steel polymeric material.

Figure 2:
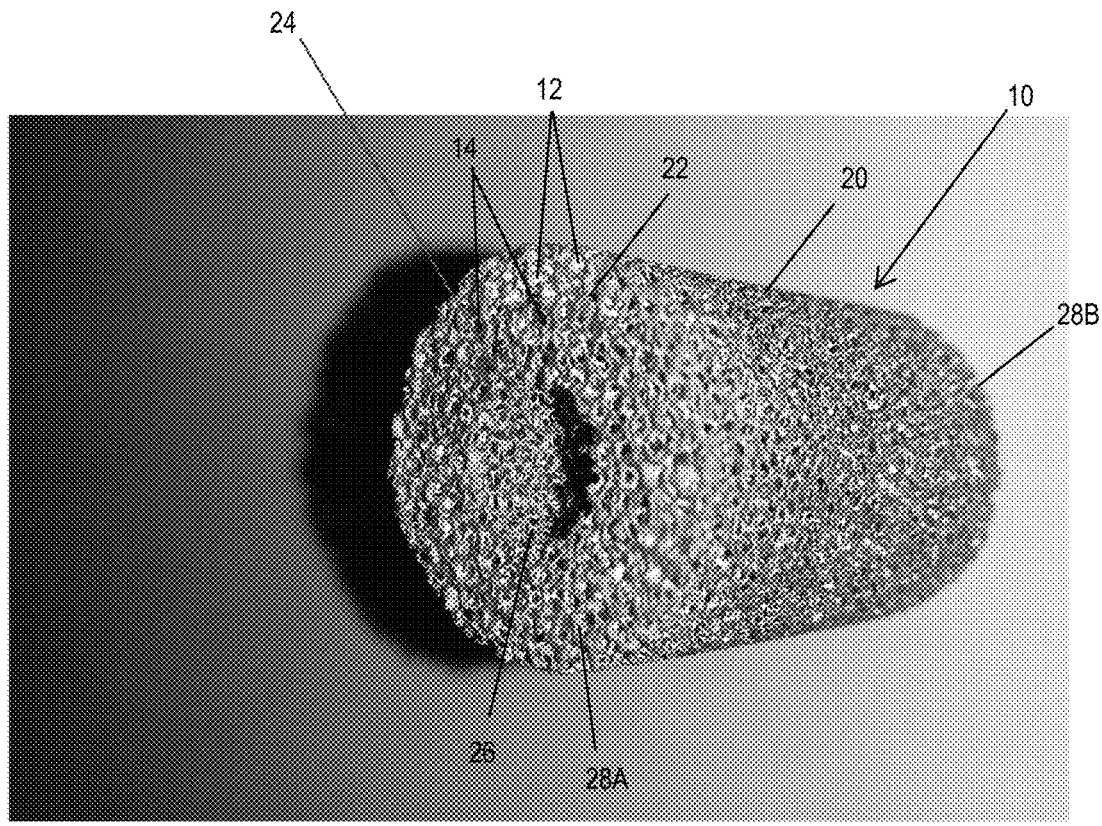
FIG. 2 illustrates a side perspective view of another embodiment of a filtration device for use in airbag inflation mechanisms according to the present subject matter.
Figure 3:
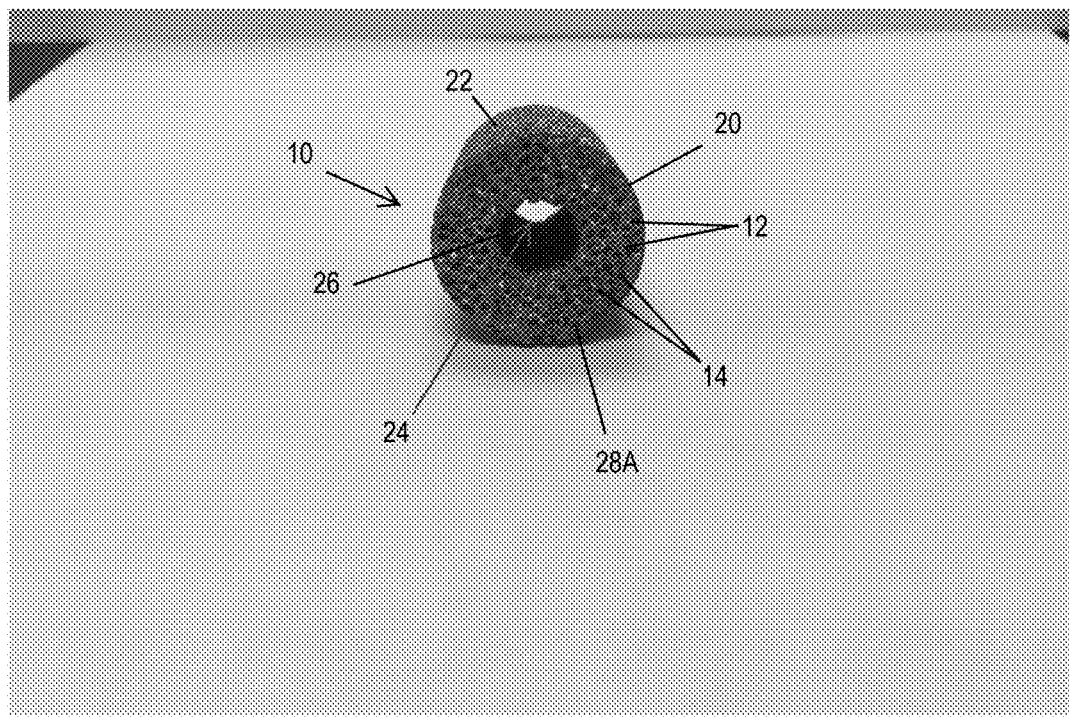
FIG. 3 illustrates a top perspective view of the embodiment of the filtration device for use in airbag inflation mechanisms according to FIG. 2.

FIGS. 2 and 3 show a similar embodiment of a filtration device 10 for use in automotive airbags. The filtration device 10 can comprise a body 20 comprising at least one of a reticulated metal foam or a reticulated ceramic foam. The body 20 can have pores 14 therein. For example, the body 20 can have between about 35 pores per square inch and about 65 pores per square inch through which air passes that is generated upon activating a pyrotechnic charge in an air bag inflation mechanism. In some embodiments, the reticulated foam body 20 can have between about 45 pores per square inch and about 55 pores per square inch. In some embodiments, the reticulated foam body 20 can have about 50 pores per square inch.

For the strength, durability and efficiency of the filtration device 10, the body 20 can have a lower mass and a density that is less overall and, at the same time, more homogeneous across the body 20 than conventional wire filtration devices C as shown in FIG. 1A. For example, for a standard cylindrical filtration device as shown in FIGS. 1B-3, the filtration device 10 can have a reticulated foam body 20 that subject to the product geometry can comprise a mass of between about 25 grams to about 40 grams. In some embodiments, the reticulated foam body 20 can have a mass of between about 30 grams to about 40 grams.

In some embodiments, the reticulated foam body 20 can have a mass of between about 30 grams to about 38 grams. For example, the reticulated foam body 20 can have a mass of about 30 grams. In some embodiments, the reticulated foam body 20 can have a mass range of about 28.59 grams to about 30.33 grams. In some embodiments, the reticulated foam body 20 can have a mass range of about 31.22 grams to about 32.34 grams. In another example, the reticulated foam body 20 can have a mass closer to about 38 grams.

Regarding the density of the body 20, the body 20, for example, can have a density of between about 20% and about 40% of the total volume of the reticulated foam body and still have the strength and efficiency to withstand the forces of the high velocity gas generated by the pyrotechnic charge in an airbag inflation mechanism while removing generally all waste particulates greater in diameter than at least about 0.002 of an inch from the generate gas with less pressure drop across the filtration device 10 as compared with conventional airbag filtration devices. The density of such reticulated foam bodies can be generally uniform across the whole body. In some embodiments, the reticulated foam body 20 can have a density of between about 24% and about 37% of the total volume of the reticulated foam body. For example, the reticulated foam body 20 can have a density of about 34.73% to about 36.71% in some embodiments. In some embodiments, the reticulated foam body 20 can have a density range of about 32.27% to about 33.21%.

For example, in some embodiments in which the material comprising the body is uniformly distributed regardless of the shape of the body of the filter, the reticulated foam body can have a density of about 22% to about 35% of the total volume of the reticulated foam body. In some such embodiments, the reticulated foam body can have a density of about 27% to about 34%. For instance, the reticulated foam body can have a density of about 27% to about 32%. For example, the density can be generally uniform such that the reticulated foam body can have a density of about 22% per unit length of the walls of the filtration device body to about 35% per unit length. For example, the reticulated foam body can have a generally uniform density with this generally uniform density of about 22% per mm to about 35% per mm across the length of the walls of the filtration device body. In some embodiments, the reticulated foam body can have a generally uniform density of about 27% per mm to about 34% per mm across the length of the walls of the filtration device body Without wishing to be bound by any particular theory, it is presently contemplated that based on the use of a reticulated foam, a body of a filtration device needs to have a certain strength or structural integrity to withstand the impinging gas jet, its shockwave, and related forces created during the activation of the pyrotechnic charge in an airbag inflation mechanism used to inflate the airbag instantaneously for all practical purposes. For example, depending on the materials used in forming the reticulated foam bodies of the filtration devices, the density can be used as a measure of expected structural integrity of the filtration device body to withstand such forces.

In embodiments that use a stainless steel reticulated foam cored filtration device, the body of the filtration device can have a generally uniform density of between about 24% and about 35% of the total volume of the reticulated foam body. For example, a stainless steel reticulated foam cored filtration device with a semi-smooth strut surface and overall geometry of about 22 mm diameter and about 30 mm overall length can have a density of at least about 27% to provide a consistent impinging gas jet performance. In some such embodiments, to possibly improve filtration of the gas, the diffusing of heat from the gas, and/or other aspects of heat transfer, a stainless steel reticulated foam cored filtration device can have a density of about 30% to about 34%. To illustrate the impact that the forces of the pyrotechnic charge in an airbag inflation mechanism have on the filtration devices and the densities of the stainless steel reticulated foam filtration device bodies that can withstand such forces, a graph of the change in thickness of such filtration device bodies after the activation of the pyrotechnic charge compared to the density of the filtration device bodies before such activation as measures as a percentage of the volumes of the walls of the filtration device is shown FIG. 13, which is explained in more detail below.

As shown in FIGS. 2 and 3, the body 20 can comprise one or more outer walls 22 and can have a cored aperture 24 that passes through a center portion 26 of the body 20 between the one or more outer walls 22 from a first end 28A to a second end 28B. In some embodiments, the wall 22 can comprise a generally homogeneous density across a length and a width of the respective wall 22. In particular, the wall 22 of the reticulated foam body 20 can comprise a generally homogeneous pore size distribution across the wall 22 of the reticulated foam body 20. When the filtration device 10 is inserted into an inflator system (not shown), the pyrotechnic charge in an airbag inflation mechanism can reside within the cored aperture 24 with the ends 28A and 28B sealed off so that the high velocity gas or gases generated by the activation of the pyrotechnic charge in an airbag inflation mechanism have to travel through the wall 22 of the body 20.

Figure 4:
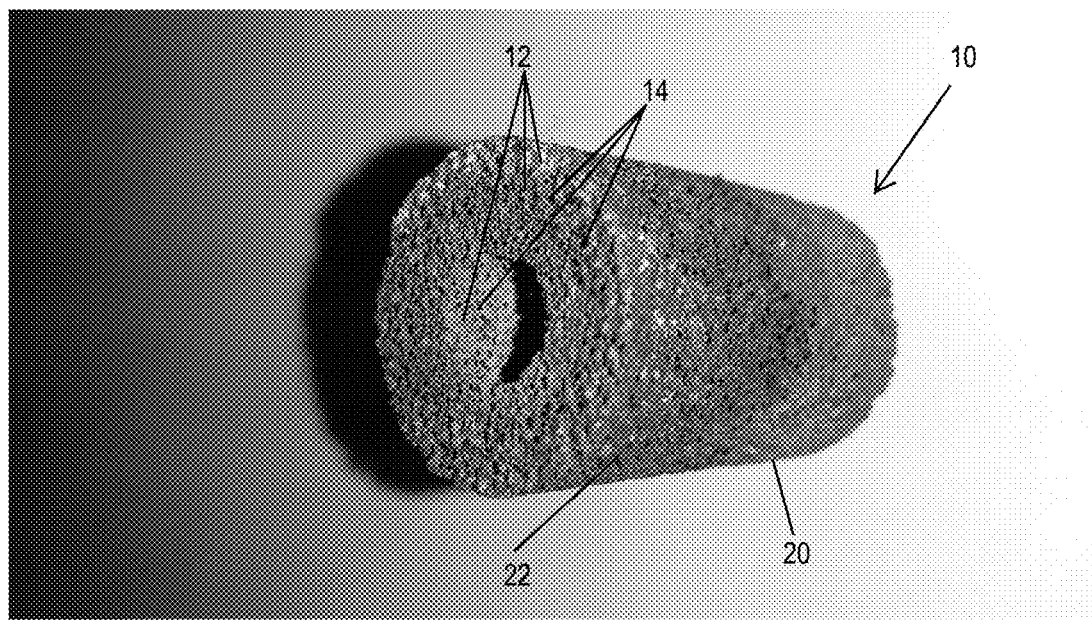
FIGS. 4 and 5 illustrate side perspective views of an embodiment of a filtration device after activation of an airbag inflation mechanism according to the present subject matter.
Figure 5:
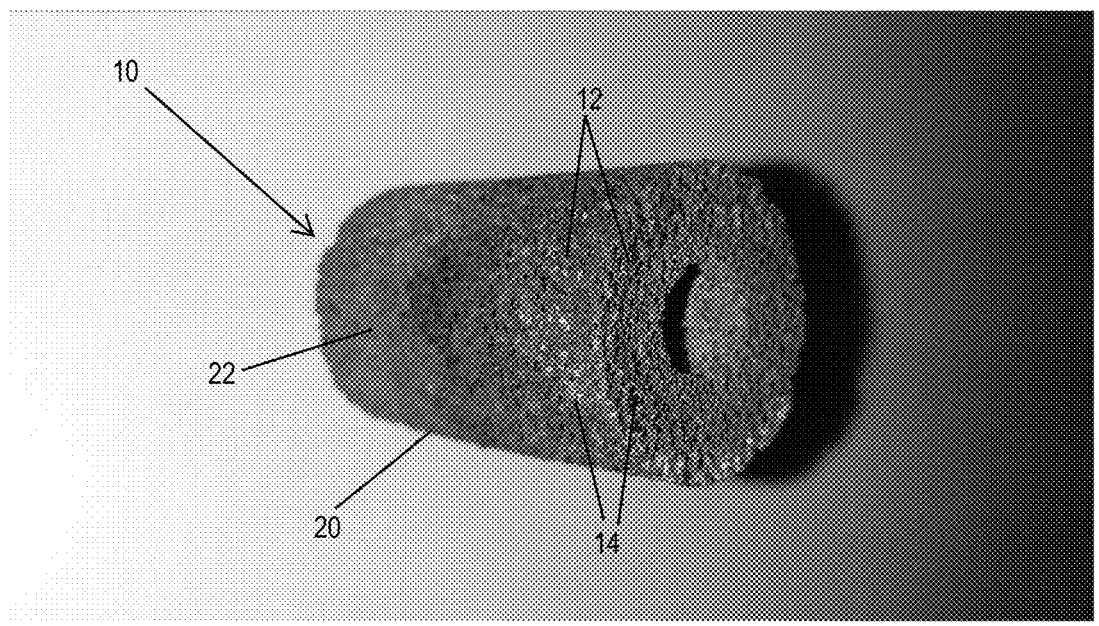

FIGS. 4 and 5 illustrate a used filtration device 10 after the activation of a pyrotechnic charge in an airbag inflation mechanism. As can be seen, the body 20 of the filtration device 10 is blackened with residue resulting from the removal of waste particulates from the generant gas or gases and the diffusion and absorption of heat from the generant gas or gases that have passed through the body 20 of the filtration device 10. Thereby, the filtration device 10, and particularly, the body 20 can serve as an effective heat sink to remove heat from the generant gas or gases as the gas or gases pass through the body 20 of the filtration device 10.

Referring to FIGS. 2-5 and as stated above, the body 20 can comprise interconnected struts 12 that define the pores 14 within the body through which the generant gas passes. The struts 12 can define or have geometries that cause the generant gas or gases to turn and bend as the gases flow through the filter. For example, the geometries of the struts 12 can be configured to force generant gas to change or slightly alter the direction of flow through the contact of the gas with the struts 12 within the reticulated foam body 20 of the filtration device 10 as the generant gas passes through the pores 14 of the reticulated foam body 20. The contact of the gases against, or with, the struts 12 of the body 20 can facilitate the diffusion of heat from the generant gas that is generated from the activating of the pyrotechnic charge in the air bag inflation mechanism. Further, the body 20 can, thereby, absorb heat from the generant gas from the activating of the pyrotechnic charge in the air bag inflation mechanism. This contact of the gases against, or with, the struts 12 of the body 20 can facilitate the capture of waste particulates from the generant gas generated by the activating of the pyrotechnic charge in the air bag inflation mechanism as well.

Figure 6A:
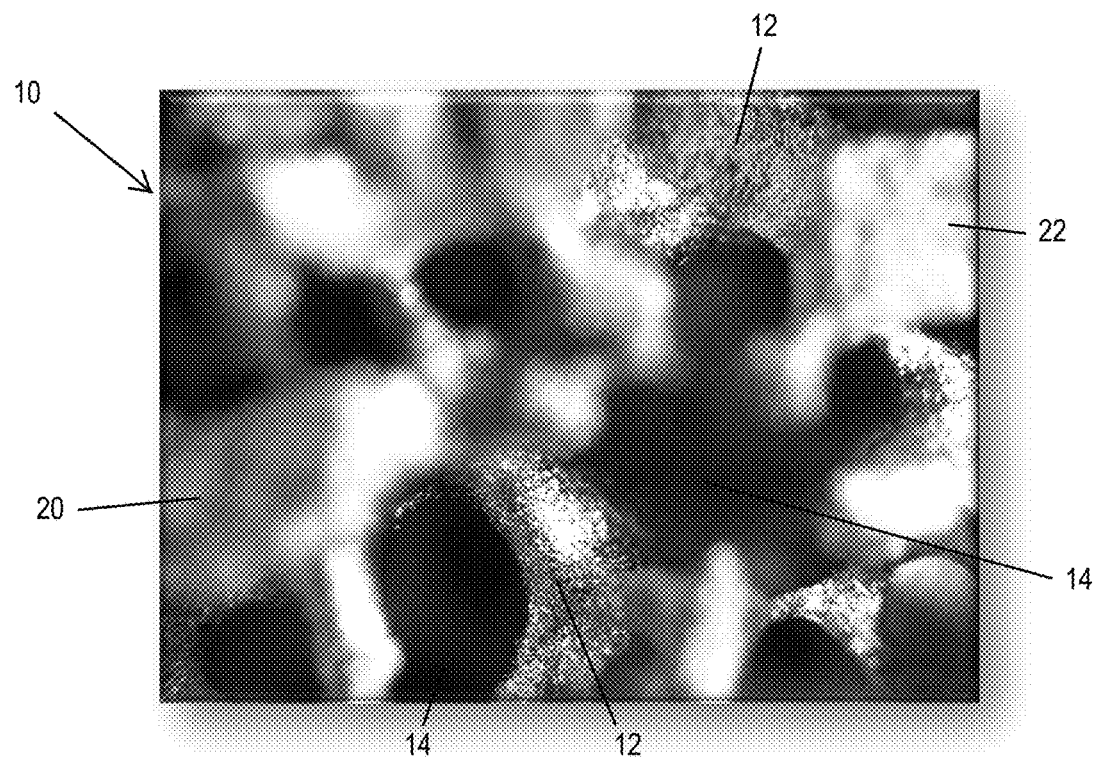
FIG. 6A illustrates a close-up view of an interior portion of an embodiment of a filtration device for use in airbag inflation mechanisms according to the present subject matter.
Figure 6B:
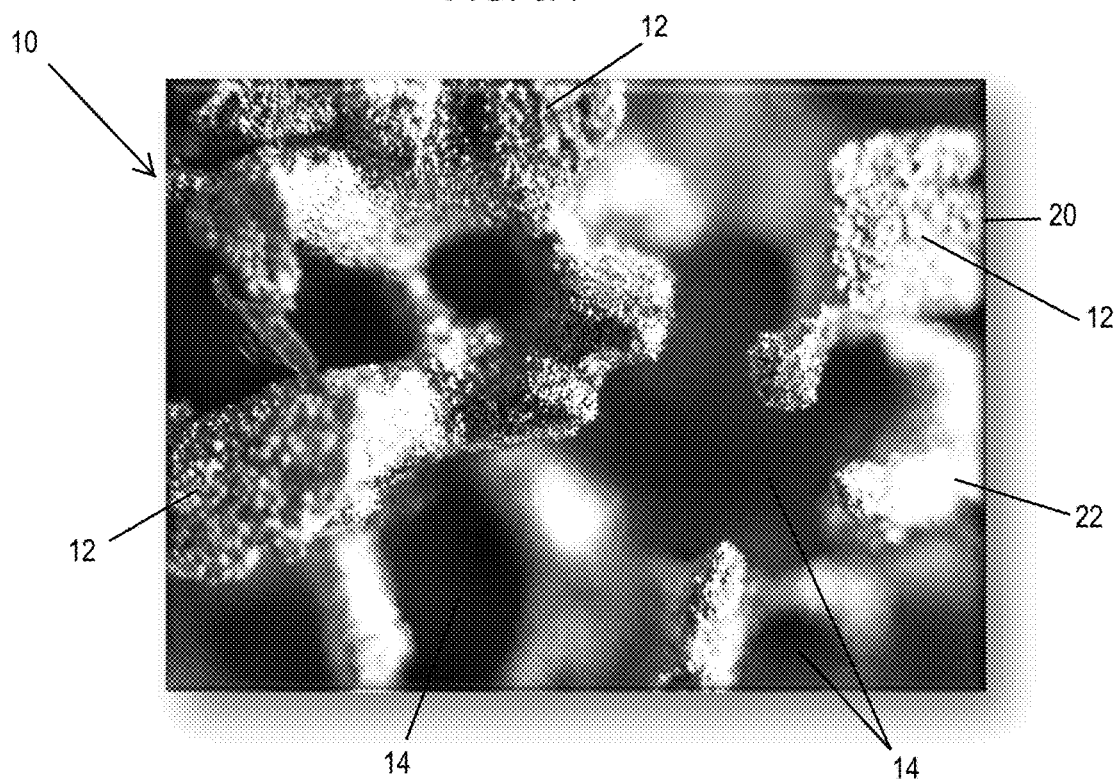
FIG. 6B illustrates a close-up view of an exterior portion of the embodiment of a filtration device for use in airbag inflation mechanisms according to FIG. 6A.

FIGS. 6A and 6B show a close-up of a small portion of an embodiment of a filtration device 10. FIG. 6A focuses on the interior structure of a portion of a wall 22 of a body 20 and FIG. 6B focuses on the exterior structure of that same portion of the wall 22 of the body 20. As can be seen, the struts 12 extend through the body 20. The struts 12 on the interior of the body 20 may be different in shape but generally similar to the struts 12 on the exterior of the body 20 and the struts 12 are interconnected. This interconnected network of struts 12 can define the pores 14 within the body 20 and can extend through the body 20 across its width and its length in a generally homogenous fashion so that the density in one section of the body 20 is generally the same or similar to the density of another section of the body 20. In some embodiments as in FIGS. 6A and 6B, the struts 12 on the interior (shown in FIG. 6A) can have a smoother surface as compared to the struts 12 on the exterior (as shown in FIG. 6B). For example, the struts 12 on the interior can be smoother to increase gas flow closer to the point of activation of the pyrotechnic, while the struts 12 on the exterior can be rougher to increase particle capture at or before the gas exits the filter.

In some embodiments, the filtration device can have struts that have generally all smooth strut surfaces. In some embodiments, the filtration device can have struts that have generally all semi-smooth strut surfaces. In some embodiments, the filtration device can have struts that have generally all rough and irregular strut surfaces. In some embodiments, the filtration device can have struts that have some combination of smooth strut surfaces, semi-smooth strut surfaces, and rough and irregular strut surfaces.

Figure 7:
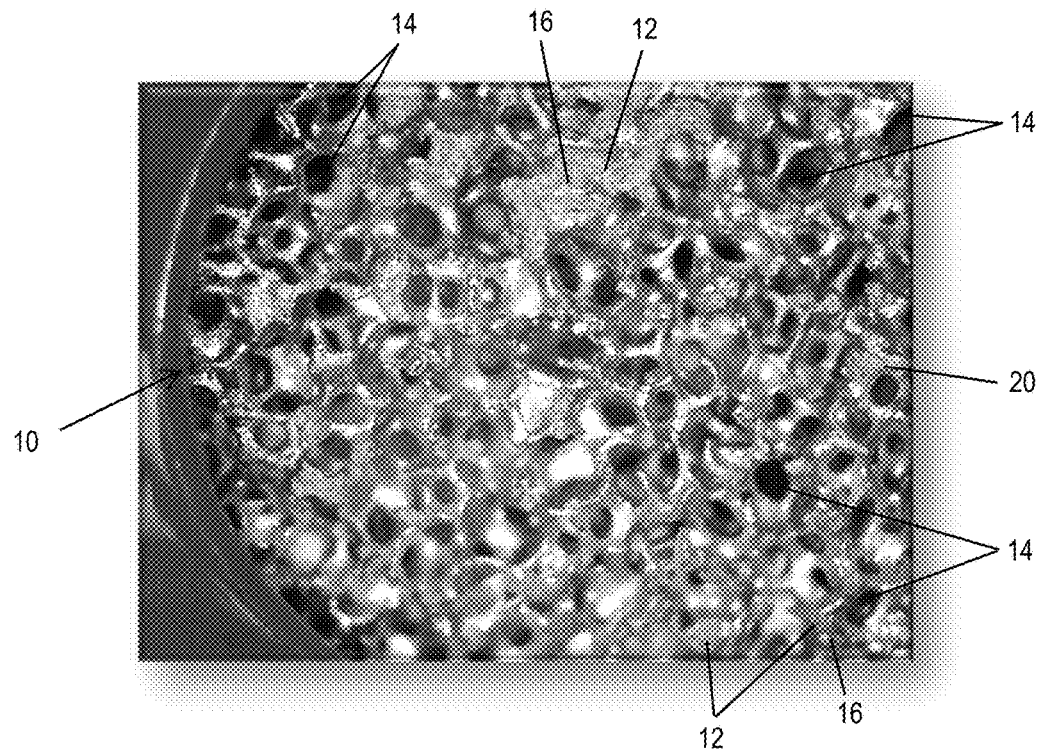
FIG. 7 illustrates a close-up view of a portion of another embodiment of a filtration device for use in airbag inflation mechanisms according to the present subject matter.
Figure 8:
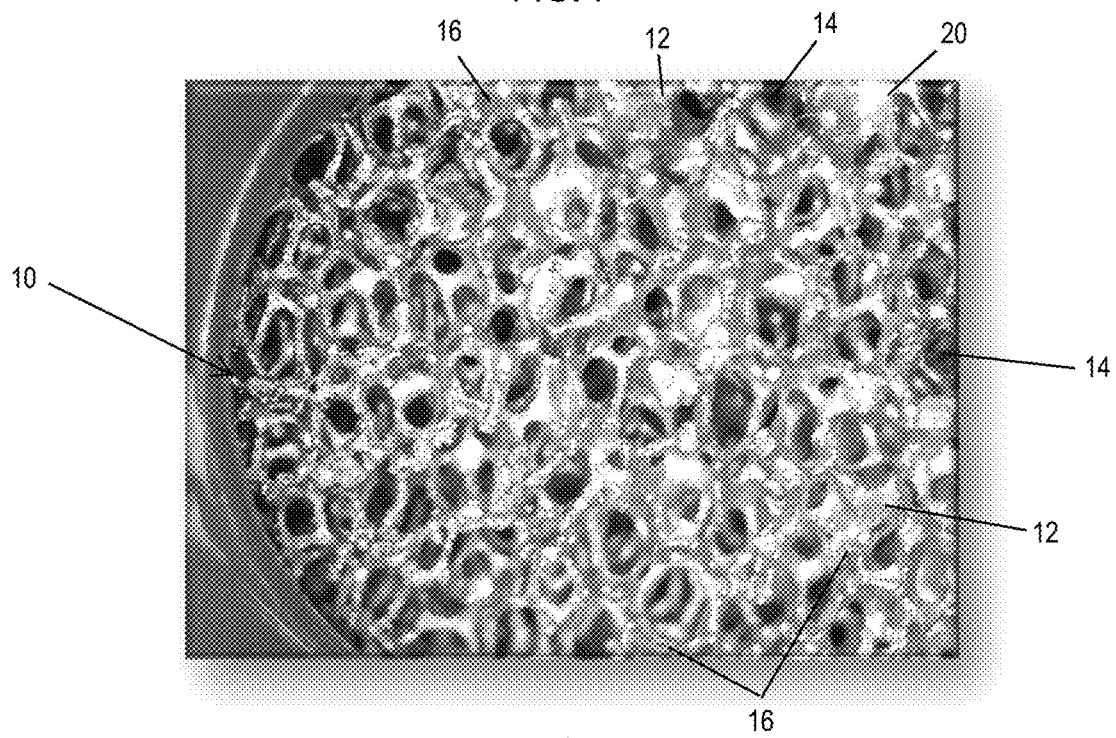
FIG. 8 illustrates a close-up view of a portion of an additional embodiment of a filtration device for use in airbag inflation mechanisms according to the present subject matter.
Figure 9:
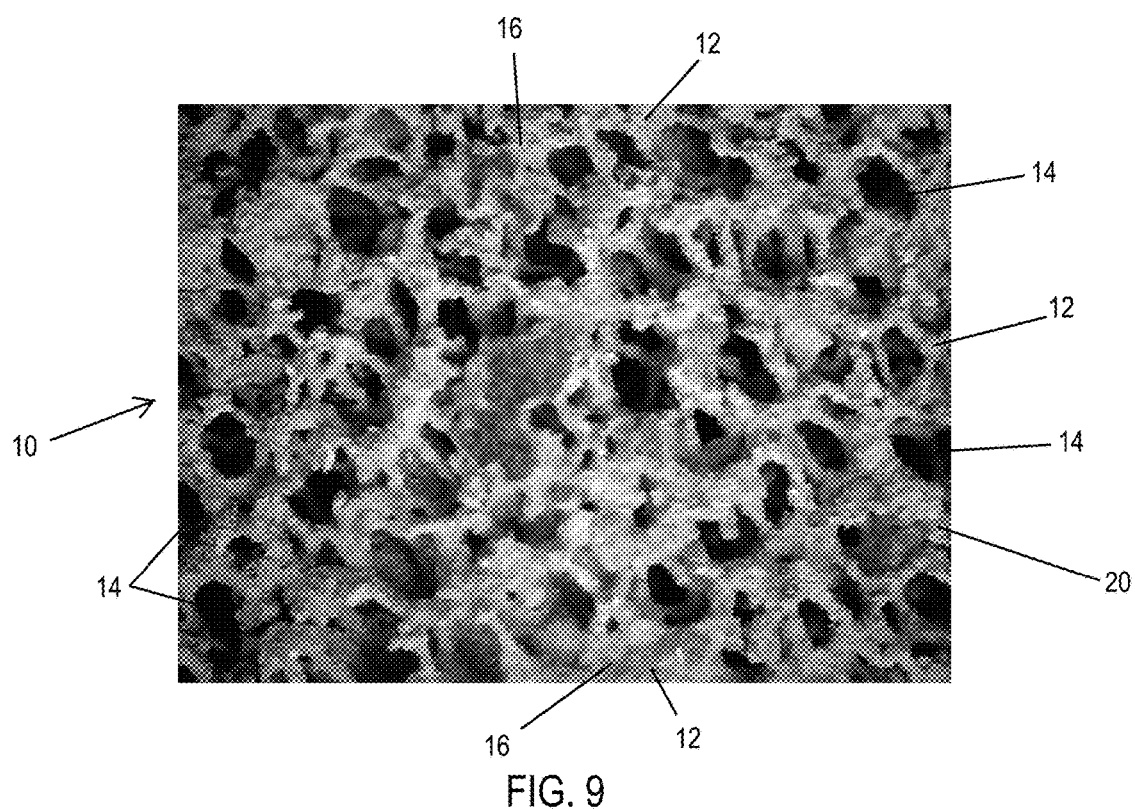
FIG. 9 illustrates a close-up view of a portion of a further embodiment of a filtration device for use in airbag inflation mechanisms according to the present subject matter.

FIGS. 7-9 illustrate close-up views of portions of other embodiments of filtration devices 10. For example, the filtration device 10 shown in FIG. 7 can be considered an embodiment with a reticulated foam body 20 that generally has fewer pores per square inch than a reticulated foam body 20 of the filtration device 10 shown in FIG. 8. FIG. 9 shows a further embodiment of a filtration device 10 with a reticulated foam body 20. Referring to FIGS. 7-9 and as shown in each figure, interconnected struts 12 of the reticulated foam body 20 can diffuse heat from the generant gas from the activating of the pyrotechnic charge in the air bag inflation mechanism. Similarly, the interconnected struts 12 of the reticulated foam body 20 can absorb the heat from the generant gas from the activating of the pyrotechnic charge in the air bag inflation mechanism. Thus, the interconnected struts 12 of the reticulated foam body 20 can be configured to not only remove heat, but also capture waste particulates from the generant gas generated by the activating of the pyrotechnic charge in the air bag inflation mechanism.

In particular, as stated above, the interconnected struts 12 can comprise strut geometries that can be configured to force generant gas to change direction of flow of the gas within the reticulated foam body 20 as the generant gas passes through the pores 14 of the reticulated foam body 20. Similarly, the interconnected struts 12 can comprise strut geometries that are configured to capture particulate debris as the generant gas passes through the pores 14 of the reticulated foam body 20. For example, the interconnected struts 12 can comprise irregular strut surfaces that are configured to force generant gas to change direction of flow of the gas within the reticulated foam body 20 and capture waste particulates as the generant gas passes through the pores 14 of the reticulated foam body 20. More particularly, the surfaces of the struts 12 can comprise gas wetted surfaces 16 that are configured to dissipate and absorb heat and capture particulate debris as the generant gas passes through the pores 14 of the reticulated foam body 20. In some embodiments, the gas wetted surface area can be between about 0.022 $m^3$ and about 0.031 $m^2$ for the gas wetted surfaces 16 of the struts 12. In some embodiments, the interconnected struts 12 can comprise semi-smooth strut surfaces.

Figure 10:
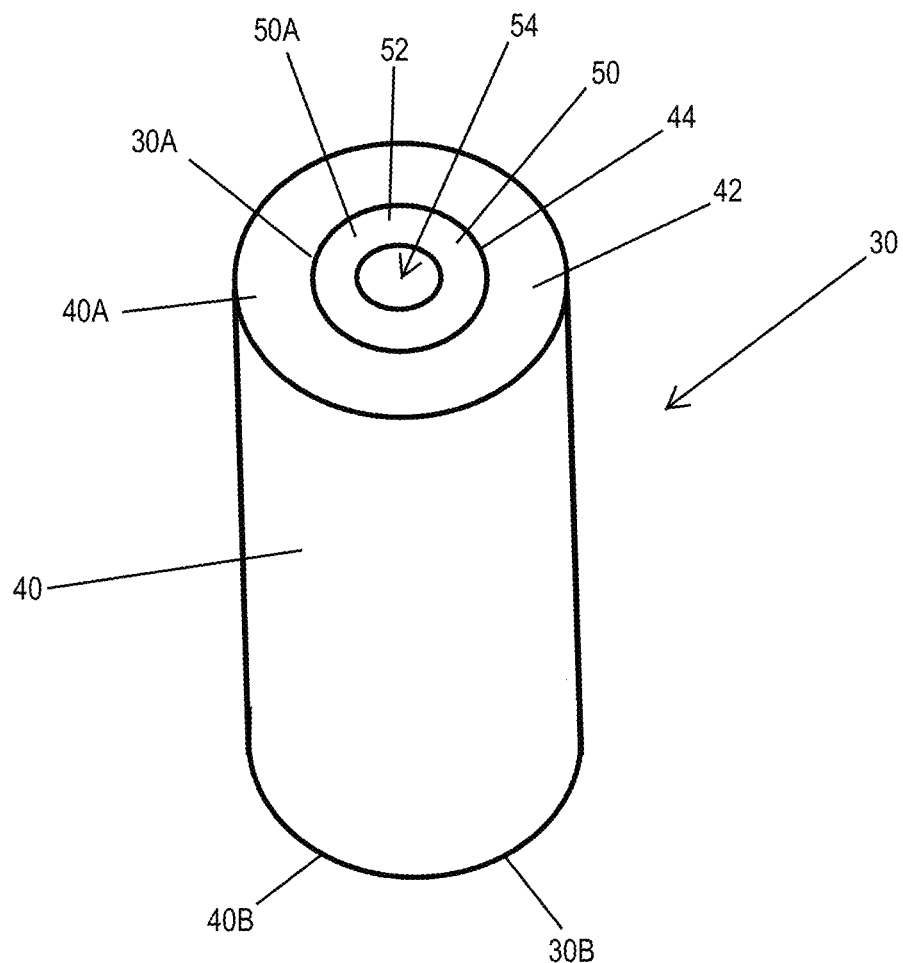
FIG. 10 illustrates a perspective view of an embodiment of a filtration device for use in airbag inflation mechanisms having an inner body portion and an outer body portion according to the present subject matter.

FIG. 10 illustrates a further embodiment of a filtration device 30. The filtration device 30 can comprise an outer body 40 and an inner body 50 that can be nested in the outer body 40 to create a dual bodied filtration device 30. The outer body 40 can comprise at least one of a reticulated metal foam or a reticulated ceramic foam. The outer body can also comprise one or more walls 42 and can have a cavity 44 between the one or more walls 42. The inner body 50 can also comprise at least one of a reticulated metal foam or a reticulated ceramic foam. The inner body 50 can be inserted into and reside within the cavity 44 of the outer body 50. The inner body 50 can be tightly fitted within the cavity 44 of the outer body 40 so that the inner body 50 is held within the outer body 40. The inner body 50 and the outer body 40 can thus be configured to filter debris particulates and dissipate heat from gas or gases passing through the inner body 50 and the outer body 40 that is generated upon activating a pyrotechnic charge in an air bag inflation mechanism.

As described above, the outer body 40 can comprise interconnected struts that define pores (not shown in FIG. 10) within the outer body 40 through which gas passes that is generated upon activating a pyrotechnic charge in an air bag inflation mechanism. Similarly, the inner body 50 can comprise interconnected struts that define pores (not shown in FIG. 10) within the inner body 50 through which gas passes that is generated upon activating a pyrotechnic charge in an air bag inflation mechanism.

In some embodiments, the cavity 44 of the outer body 40 can comprise a cored aperture that passes through a center portion of the outer body 40 between the one or more walls 42 from a first end 40A to a second end 40B. Depending on the shape of the inner body 50, the diameter or the length and width of the cavity 44 can be sized to allow the inner body 50 to fit within the cavity 44. In some embodiments, the wall 42 can comprise a generally homogeneous density across the respective wall 42. In particular, the wall 42 of the outer body 40 can comprise a generally homogeneous pore size distribution across the wall 42 of the outer body 40.

Similarly, the inner body 50 can comprise one or more walls 52 and can have a cored aperture 54 that passes through a center portion of the inner body 50 between the one or more walls 52 from a first end 50A to a second end (not shown). In some embodiments, the wall 52 can comprise a generally homogeneous density across the respective wall 52. In particular, the wall 62 of the inner body 50 can comprise a generally homogeneous pore size distribution across the wall 52 of the reticulated foam body 50. Once the inner body is inserted and held within the cavity 44 of the outer body, the filtration device 30 can be inserted into an inflator system (not shown). In particular, the filtration device 30 can be place over the pyrotechnic charge in an airbag inflation mechanism so that the pyrotechnic charge can reside within the cored aperture 54 with ends 30A and 30B of the filtration device 30 sealed off so that the high velocity gas or gases generated by the activating of the pyrotechnic charge in an airbag inflation mechanism have to travel through the wall 52 of the inner body 50 and then the wall 42 of the outer body 40.

In some embodiments of the filtration device 30, the outer body 40 has a different average pores per square inch than the average pores per square inch that the inner body 50 has. Similarly, the outer body 40 can have a different density than the density of the inner body 50. Additionally, the outer body 40 can have a different mass than the mass of the inner body 50. In this manner, the inner body 50 that encounters the initial blast of gas(es) and debris particulates from the activating of the pyrotechnic charge can absorb the shock and can begin filtration and heat dissipation that is then continued in a different composition of the outer body 40 before the gas(es) exit from the filtration device 30.

For example, in some embodiments, the outer body 40 can have a higher average pores per square inch than the average pores per square inch of the inner body 50. In some embodiments, the inner body 50 can have a higher average pores per square inch than the average pores per square inch of the outer body 40. In some embodiments, the outer body 40 can have between about 45 pores per square inch and about 65 pores per square inch and the inner body 50 can have between about 35 pores per square inch and about 55 pores per square inch. For example, in some embodiments, the outer body 40 can have about 65 pores per square inch and the inner body 50 can have about 45 pores per square inch. In some embodiments, the outer body 40 can have about 65 pores per square inch and the inner body 50 can have about 50 pores per square inch. In some embodiments, the outer body 40 can have about 55 pores per square inch and the inner body 50 can have about 45 pores per square inch. In some embodiments, the outer body 40 can have about 50 pores per square inch and the inner body 50 can have about 65 pores per square inch. In some embodiments, the outer body 40 can have about 45 pores per square inch and the inner body 50 can have about 55 pores per square inch.

Figure 11:
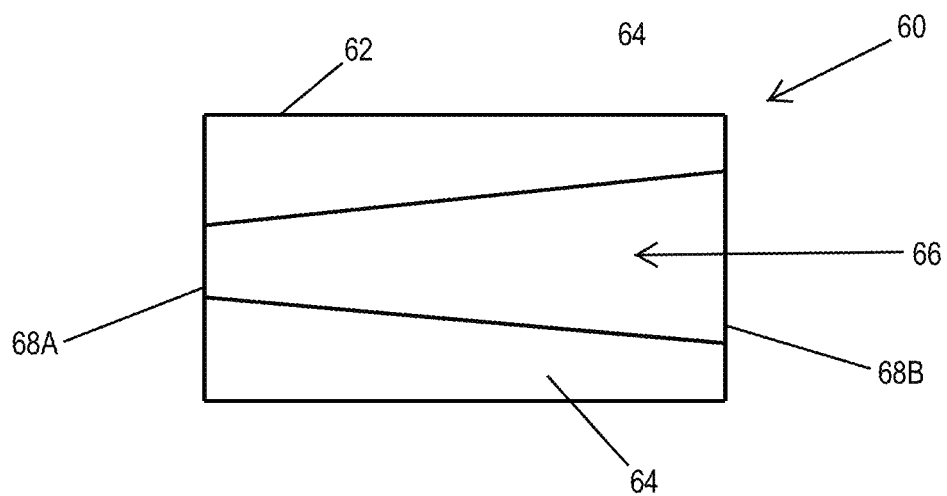
FIG. 11 illustrates a schematic cross-sectional view of an additional embodiment of a filtration device for use in airbag inflation mechanisms according to the present subject matter.
Figure 12:
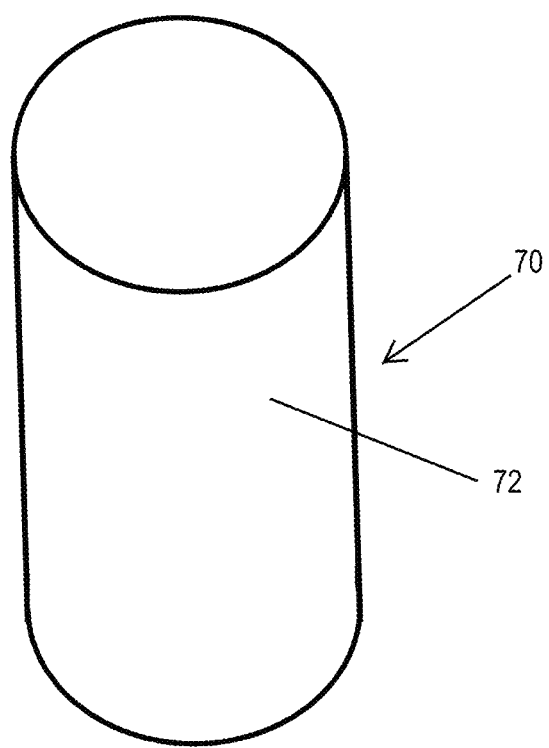
FIG. 12 illustrates a perspective view of a portion of a further example embodiment of a filtration device for use in airbag inflation mechanisms according to the present subject matter.

It has been found that the inner bore geometry of the filtration devices disclosed herein can influence particulate deposition. For example, FIG. 11 shows a cross-sectional view of a different embodiment of a filtration device 60. The filtration device 60 can comprise a body 62 having tapered walls 64. The walls 64 of the body 62 can comprise interconnected struts that define pores (not shown in FIG. 11) within the walls 64 of the body 62 through which gas passes that is generated upon activating a pyrotechnic charge in an air bag inflation mechanism. The tapered walls 64 can form a tapered bore 66 to raise gas velocity and increase heavy particulate deposition at the front of the filtration device 60. For example, in some embodiments, the walls 64 can taper from a first end 68A of the body 62 to a second end 68B. In such embodiments, the second end 68B of the body 62 of the filtration device 60 can be disposed at the venturi of the pyrotechnic device so that the larger end of the tapered bore 66 is the entry point of the generant gases that pass through the filtration device 60. The first end 68A in such embodiments can be a closed end within the air bag inflation mechanism. FIG. 12 shows a perspective view of another embodiment of a filtration device 70 that can comprise a body 72 with no aperture extending through the center portion of the body 72. The body 72 can comprise interconnected struts that define pores (not shown in FIG. 11) the body 72 through which gas passes that is generated upon activating a pyrotechnic charge in an air bag inflation mechanism.

While the filtration devices shown herein are generally cylindrical in shape for illustrative purposes, the filtration devices that have metal or ceramic reticulated foam bodies as disclosed herein can have different three-dimensional shapes depending on and as required by the airbag and airbag inflator system in which it is used. Such different shapes of the filtration devices as disclosed herein can be defined by the location and mounting placement of air bag within a vehicle, the shape and size of the airbag, the amount of gas needed to inflate the airbag, and the like. For example, the filtration devices can comprise other three-dimensional shapes such as cubes, cuboids, triangular prisms, hexagonal prisms, octagonal prisms, spheres, cones, tetrahedron, and square-based prisms, etc.

Further different metal or ceramic reticulate foams can be used to form the filtration devices disclosed herein. For example, filtration materials can include, but not limited to, mild steel, stainless steel, nickel alloys, such as Nickel-Molybdenum-Chromium alloys, etc. Thus, a range of metallurgy with varying and dual density, pore size and lesser pressure drop compared to the current state-of-the-art filtration devices can be used.

Filter Testing Apparatus and Testing Results

A filter testing apparatus is also provided that can be used to test an ability of an airbag system filter to remove the particulates from the high velocity gas generated during an airbag system deployment and an ability of the airbag system filter to diffuse heat from the generated high velocity gas before entering the fabric airbag cushioning. The filter testing apparatus can be used to determine the functionality and performance of filters, such as the metal and ceramic foam filters for this novel design.

To investigate the parameters listed above, the filter testing apparatus can include a pyrotechnic simulation machine. In particular, the test equipment can comprise a pyrotechnic combustion device with the capability to generate a gas jet with a given temperature and velocity. The testing apparatus can also comprise a venturi of equivalent geometry and an airbag pyrotechnic device outlet port. The gas generated by the pyrotechnic combustion device can be projected through the venturi of equivalent geometry to an airbag pyrotechnic device outlet port. A temperature adjuster can be provided that can be used to adjust the gas temperature in the range of about 450° C. to about 1,250° C. in approximately 100° C. increments. A velocity adjuster can be provided that can adjust the gas velocity in the range of about Mach 1 to about Mach 9 in increments of about Mach 0.5 and is capable of projecting debris and specifically sized particulate to impact a fabric or textile.

The filter testing apparatus can also simulate a specific air bag inflator device event utilizing specific manufacturers components incorporated into custom designed test equipment. Using the temperature and velocity adjusters, the filter testing apparatus can be adapted to cover all current and proposed styles and locations of air bag cushion.

The filter testing apparatus can have a sturdy, six (6) feet square frame to mount the pyrotechnic device. The pyrotechnic device is also movable about the frame to various positions depending upon the nature of the test to be conducted. Once moved, the pyrotechnic device can be locked in position with the use of substantial dowel pins. The pyrotechnic mounting frame can be located on two (2) heavy mild steel machined vertical plates that move on two (2) parallel five (5) feet linear bearings to ensure ease of movement, accurate and repetitive location and minimal deflection when locked during pyrotechnic device activation. The filter testing apparatus can have a dual development role for high temperature material applications and also for producing and developing filter performance data based on particulate removal and heat diffusion from the generated high velocity gas.

The test performed on the filter testing apparatus can closely replicate the function of a typical pyrotechnic inflator. Thus, the filter testing apparatus can be used to not only evaluate filter performance, but also to evaluate the ability of a heat shield material and/or coating to produce a quantifiable thermal barrier and resistance to high velocity supersonic impinging gas jet.

The process of testing a filtration device on the filter testing apparatus can be similar to the fabric test with the addition of a fixture to retain or simulate an airbag inflator body or similar pressure vessel. The filtration device can be mounted in a manner to replicate the position and location in an air cushion assembly. The filtration device can be cylindrical in shape but this is not necessarily required as the location within the vehicle and the mounting requirements of the particular airbag can be used to define the actual shape of the filtration device. Using the inflator cylindrical shape for illustration purposes, the generant gas can enter the filtration device at one end and exit through the air cushion inflation orifices. The purpose of the filtration device is twofold. First, the filtration device should extract and retain the waste particulates and byproducts of the combustion used to generate the high velocity gas in the inflator while passing the nitrogen gas into the air cushion. Second, the filtration device should act as a heat exchanger and extract temperature from the generant gas as it exits the inflator device. During the test, the inflator gas and its contents can be extracted from the filter testing apparatus to be collected for evaluation or to be vented to atmosphere. Dependent upon the configuration of the filter testing apparatus, the material retained in the filtration device and generant mechanism can be accurately measured and a performance metric for different filtration devices can be developed. The filter testing apparatus can also incorporate a stainless chamber that has a one micron filter element that captures any debris or particulates and can permit a quantifiable and accurate measurement of the exit material mass and particulate size. The removable filtration device can permit immediate analysis of exit debris in addition to definitive particle capture metrics. This measurement can be particularly useful for establishing the safe working filtration requirements of the pyrotechnic inflator device.

The filter testing apparatus can have the capability to quantify the volume of filtration residue captured within the filter as it relates to the pore size, strut dimension, texture and surface properties of the filtration component configuration by firing the airbag pyrotechnic device within the filtration device in the closed system of the filter testing apparatus and measuring all the residue within the closed system. In addition, the material exiting the filter can be collected and can be quantified both by mass and particle size.

Having devised a filter testing apparatus for evaluating the thermodynamic and structural integrity parameters of an air cushion filter, it is possible to systematically develop the optimal configuration for a filter using reticulated metal or ceramic. The development process involves, but is not limited to, the application of polymer metal technology to create a metallic filtration device. The polymer metal granular sizes and granular blends can affect strut geometries and thermal absorption. The testing process permits variations in solids content during the development process and also permits the evaluation of a wide range of filtration materials including but not limited too mild steel, stainless steel, etc. A factor in the product configuration is the net weight and density of the final product. The viscosity and rheology of the material(s) can also be factors in the manufacturing process and have been developed using the filter testing apparatus. This technology permits the introduction of specialist metallic and polymeric filtration techniques to optimize the particular air cushion inflator application. The particle size and packaging determine both the structural integrity and optimized gas wetted surface area for heat transfer.

Optimizing the process by comparing different metals and polymer combinations, wetting and wettability in both foam core and polymer metal, the use of rheological aids, mixing agglomerations, polymer drying and curing processes, sintering densification and shrinkage are all process parameters that can only be evaluated with extensive pyrotechnic testing.

The testing/development equipment has the capability to quantify the volume of filtration residue captured within the filtration device as it relates to the pore size, strut dimension and, texture and surface properties of the filtration component configuration. In addition, the material exiting the filter is collected and can be quantified both by mass, chemical construction and particle size.

This testing using the testing apparatus described above has established the basic performance parameters and product structure of the filtration devices described herein. The filtration devices disclosed herein provide a significant improvement in particulate capture and hot gas heat sink over the current filtration technology used in conjunction with automotive airbags.

Figure 13:
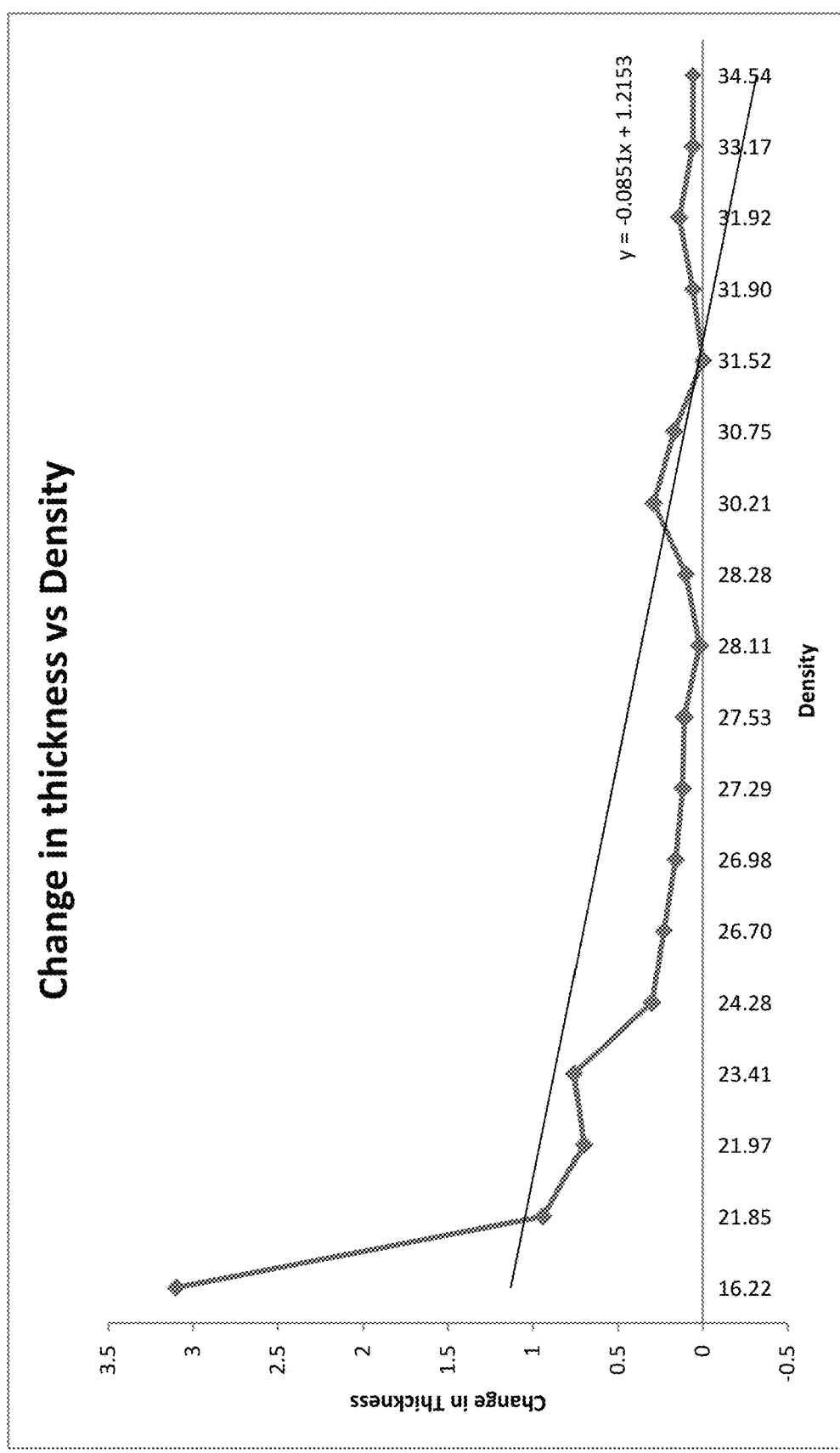
FIG. 13 illustrates a graph of changes in thicknesses of embodiments of filtration devices after exposure to an activation of a pyrotechnic charge in an airbag inflation mechanism as measured against the density of the respective filtration devices according to the present subject matter.

For example, FIG. 13 illustrates a graph of changes in thicknesses of embodiments of filtration devices after exposure to an activation of a pyrotechnic charge in an airbag inflation mechanism as measured against the density of the respective filtration devices. In particular, a plurality of whole cylindrical disc filtration device bodies of stainless steel reticulated foam was provided with all having diameters of about 22 mm and thicknesses of about 7.5 mm were provided. Each cylindrical disc filtration device body had no bore therethrough and each had a different density as measured as a percentage of the total volume of the cylindrical shape of the disc filtration device body. The densities ranged from about 16% to about 35%. Each disc filtration device body was placed in a filter testing apparatus. As described above, the testing/development apparatus has the capability to provide both a range of gas velocity simulations and a consistent repetitive impinging gas jet and associated shock wave that can permit the determination of the optimum filtration device mass/density while minimizing material and weight of the specific filtration device component. A pyrotechnic charge that simulates the impinging gas jet and associated shock wave of an airbag inflation mechanism was loaded in the filter test apparatus for each disc filtration device body and each disc filtration device body as tested.

As shown in the graph of FIG. 13, the disc filtration device body of stainless steel reticulated foam having a density of about 16% was compressed by the forces of the impinging gas jet and associated shock wave by over 3 mm. The percentage change of this disc filtration device body was approximately 43% of its length. Further, the disc filtration device body having a density of about 16% had a core failure that permitted the impinging gas jet to blow a hole through the middle of the disc filtration device body. Thus, it is clear that a filtration device body of stainless steel reticulated foam having a density of about 16% does not have the structural integrity to withstand the forces generated in an airbag inflation mechanism. The graph further illustrates that while not necessarily ideal with some compression occurring, the filtration device bodies of stainless steel reticulated foam having a density of about 22% to about 24% have the structural integrity to withstand the forces generated in an airbag inflation mechanism. Further, the graph further illustrates that the filtration device bodies of stainless steel reticulated foam having a density of about 27% to about 35% have better structural integrity to withstand the forces generated in an airbag inflation mechanism while still permit passage of the inflation gases used to inflate an airbag.

For example, this testing capability indicates, that a stainless reticulated foam cored device with a semi smooth strut surface and overall geometry of 22 mm diameter and 30 mm overall length can have a density of approximately about 27% to provide a consistent impinging gas jet performance. To possibly improve filtration of the gas, the diffusing of heat from the gas, and/or other aspects of heat transfer, a stainless steel reticulated foam cored filtration device can have a density of about 30% to about 34%.

The development potential of being able to evaluate the effects of gas velocity on filter surface area, texture and overall density can have a profound influence on future filter diffuser design.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole or in part. Furthermore, those of ordinary skill in the art will appreciate that the foregoing description is by way of example only, and is not intended to limit the present subject matter.

What is claimed is:
1. A filtration device for use in automotive airbags, the filtration device comprising:
a foam cored body comprising a reticulated foam comprising granular blends of different granular sizes, the reticulated foam having a structural integrity to with- stand a supersonic shockwave generated by activation of a pyrotechnic charge in an air bag inflation mechanism; and the body comprising interconnected struts that define pores through which air that is generated upon activating the pyrotechnic charge in the air bag inflation mechanism passes; and the interconnected struts of an interior portion of the body being smoother than the interconnected struts of an exterior portion of the body to increase gas flow closer to a point of activation of the pyrotechnic, and the interconnected struts of the exterior portion of the body being rougher than the interconnected struts of the interior portion of the body to increase particle capture at or before the gas exits the filtration device.

2. The filtration device according to claim 1, wherein the body has between about 35 pores per square inch and about 65 pores per square inch.

3. The filtration device according to claim 1, wherein the body has a mass of between about 25 grams to about 40 grams.

4. The filtration device according to claim 1, wherein the body has a density of between about 20% and about 40% of the total volume of the body.

5. The filtration device according to claim 1, wherein the body comprises one or more walls, each wall comprising a generally homogeneous density across a length and a width of the respective wall.

6. The filtration device according to claim 1, wherein the body comprises a large particle polymer metal foam.

7. The filtration device according to claim 1, wherein the body comprises one or more walls that taper from a first toward a second end.

8. A filtration device for use in automotive airbags, the filtration device comprising:
　a foam cored body comprising a reticulated metal foam comprising granular blends of different granular sizes;
　the body comprising interconnected struts that define pores within the body through which gas passes that is generated upon activating a pyrotechnic charge in an air bag inflation mechanism, the body having a structural integrity to withstand a supersonic shockwave; and
　the interconnected struts of an interior portion of the body being smoother than the interconnected struts of an exterior portion of the body to increase gas flow closer to a point of activation of the pyrotechnic, while the interconnected struts of the exterior portion of the body are rougher than the interconnected struts of the interior portion of the body to increase particle capture at or before the gas exits the filtration device.

9. The filtration device according to claim 8, wherein the interconnected struts of the body absorb heat from the gas from the activation of the pyrotechnic charge in the air bag inflation mechanism.

10. The filtration device according to claim 8, wherein the interconnected struts of the body that are configured to capture waste particulates of at least 0.002 inches in size from the gas generated by the activation of the pyrotechnic charge in the air bag inflation mechanism.

11. The filtration device according to claim 8, wherein the interconnected struts comprise strut geometries that are configured to force generant gas to change directions within the body as the generant gas passes through the pores of the body.

12. The filtration device according to claim 8, wherein the interconnected struts comprise strut geometries that are configured to capture particulate debris as the generant gas passes through the pores of the body.

13. The filtration device according to claim 8, wherein the body has between about 35 pores per square inch and about 65 pores per square inch.

14. The filtration device according to claim 8, wherein the body has a density of between about 20% and about 40% of the total volume of the body.

15. The filtration device according to claim 8, wherein the body comprises one or more walls, each wall comprising a generally homogeneous density across a length and a width of the respective wall.

16. The filtration device according to claim 8, wherein the body comprises:
　an outer body comprising a reticulated metal foam, the outer body comprising walls and having a cavity between the walls;
　an inner body comprising a reticulated metal foam, the inner body residing within the cavity of the outer body; and
　the inner body and the outer body configured to filter debris particulates and dissipate heat from air passing through the inner body and the outer body that is generated upon activating a pyrotechnic charge in an air bag inflation mechanism.

17. The filtration device according to claim 16, wherein the outer body has a different density than the density of the inner body.

18. The filtration device according to claim 8, wherein the body comprises a large particle metal polymer material.

19. A method for using a filtration device in automotive airbags, the method comprising:
　providing a filtration device comprising:
　　a foam cored body comprising a reticulated foam comprising granular blends of different granular sizes, the body having a structural integrity to withstand a supersonic shockwave generated by activation of a pyrotechnic charge in an air bag inflation mechanism; and
　　the body comprising interconnected struts that define pores within the body through which a generant gas passes upon inflation of the automotive airbags, the interconnected struts of an interior portion of the body being smoother than the interconnected struts of an exterior portion of the body to Increase gas flow closer to a point of activation of the pyrotechnic, and the interconnected struts of the exterior portion of the body being rougher than the interconnected struts of the interior portion of the body to increase particle capture at or before the gas exits the filtration device; and
　placing the filtration device within the airbag inflation mechanism proximal to and surrounding the pyrotechnic charge in the air bag inflation mechanism so that, upon activating the pyrotechnic charge in the air bag inflation mechanism, the generant gas passes through the filtration device.

* * * * *